(12) United States Patent
Scherbenski et al.

(10) Patent No.: US 8,330,298 B2
(45) Date of Patent: Dec. 11, 2012

(54) GENERATING DC ELECTRIC POWER FROM AMBIENT ELECTROMAGNETIC RADIATION

(75) Inventors: Josh Scherbenski, Mountain View, CA (US); Freeman Cullom, Menlo Park, CA (US)

(73) Assignee: SCARF Technologies LLC, Mountain View, CA (US)

( * ) Notice: Subject to any disclaimer, the term of this patent is extended or adjusted under 35 U.S.C. 154(b) by 324 days.

(21) Appl. No.: 12/818,103

(22) Filed: Jun. 17, 2010

(65) Prior Publication Data

US 2011/0309686 A1 Dec. 22, 2011

(51) Int. Cl.
*H01F 27/42* (2006.01)
(52) U.S. Cl. ........................................ 307/104
(58) Field of Classification Search .................. 307/104
See application file for complete search history.

(56) References Cited

U.S. PATENT DOCUMENTS

| | | |
|---|---|---|
| 4,114,151 A | 9/1978 | Dennet et al. |
| 4,517,563 A | 5/1985 | Diamant |
| 5,833,603 A | 11/1998 | Kovacs |
| 5,889,383 A | 3/1999 | Teich |
| 5,952,814 A | 9/1999 | Van Lerberghe |
| 5,970,398 A | 10/1999 | Tuttle |
| 6,016,129 A | 1/2000 | Lauper |
| 6,037,743 A | 3/2000 | White et al. |
| 6,127,799 A | 10/2000 | Krishnan |
| 6,141,763 A | 10/2000 | Smith et al. |
| 6,184,651 B1 | 2/2001 | Fernandez et al. |
| 6,229,443 B1 | 5/2001 | Roesher |
| 6,289,237 B1 | 9/2001 | Mickle et al. |
| 6,373,447 B1 | 4/2002 | Rostoker et al. |
| 6,615,074 B2 | 9/2003 | Mickle et al. |
| 6,744,335 B2 | 6/2004 | Ryhanen et al. |
| 6,845,253 B1 | 1/2005 | Schantz |
| 6,980,084 B1 | 12/2005 | Yones |
| 6,995,731 B2 | 2/2006 | Lin |
| 7,084,605 B2 | 8/2006 | Mickle et al. |
| 7,167,090 B1 | 1/2007 | Mandal et al. |
| 7,256,695 B2 | 8/2007 | Hamel et al. |
| 7,400,253 B2 | 7/2008 | Cohen |
| 7,403,803 B2 | 7/2008 | Mickle et al. |
| 7,429,805 B2 | 9/2008 | Hamel et al. |
| 7,436,360 B2 | 10/2008 | Chen et al. |
| 7,440,780 B2 | 10/2008 | Mickle et al. |
| 7,508,346 B2 | 3/2009 | Rao et al. |
| 2007/0107766 A1 | 5/2007 | Langley, II et al. |
| 2007/0153561 A1 | 7/2007 | Mickle et al. |
| 2009/0160723 A1 | 6/2009 | Rhodes et al. |
| 2009/0327188 A1 | 12/2009 | Ryhanen et al. |

*Primary Examiner* — Robert L. Dberadinis
(74) *Attorney, Agent, or Firm* — Pillsbury Winthrop Shaw Pittman LLP

(57) ABSTRACT

At least certain embodiments describe methods, apparatuses, and systems for converting energy from electro-magnetic (EM) radiation into electric power using a simultaneous collector of ambient radio frequencies (SCARF) circuit. In one embodiment this is done by capturing EM radiation from a plurality of ambient signals using an array of antennae where each signal has a resonant frequency and aggregating the ambient signals to generate an aggregated signal having a single frequency with greater AC power than the AC power of each of the plurality of ambient signals individually. The single frequency can be produced by either the sum of the resonant frequencies of the ambient signals or the difference between the resonant frequencies of the ambient signals. The aggregated signal is then converted into useable electric power using a rectifying circuit such that for every incremental increase in the AC power of the aggregated signal, there is a corresponding exponential increase in DC power at the output of the rectifying circuit.

27 Claims, 13 Drawing Sheets

GENERATING DC ELECTRIC POWER FROM AMBIENT ELECTROMAGNETIC RADIATION

FIELD OF THE INVENTION

At least certain embodiments relate generally to the field of radio frequency engineering, and more particularly to harvesting RF energy from ambient electromagnetic sources and providing this energy as a power supply.

BACKGROUND OF THE INVENTION

RF energy harvesting devices of prior art systems are configured to collect RF and microwave signals. For example, rectifying antennas, known as rectennas, are circuits used to convert output from an antenna to DC current. A broadband antenna connected directly to a rectifying circuit may also be used to harvest energy over a broad spectrum of EM frequencies. However, this approach suffers from interference problems since the captured signals can destructively interfere with each other, especially since this approach collects such a broad spectrum of frequencies, producing a noisy output that may negate achieving optimal AC to DC power conversion. For many years, RF energy harvesters have been utilized in RFID tags to provide small bursts of power to activate the tags for a short duration. Recently, RF energy harvesting devices have been introduced commercially as stand-alone power sources. These RF energy harvesting power sources gather broadcasted, single-frequency signals from either a directed power source or a nearby RF or microwave communication source, such as a WiFi router. The power from these signals is inversely proportional to the distance squared. The power gain also falls off quicker for higher frequencies. Thus, a microwave source can only transfer a useful amount of power over a few meters.

SUMMARY OF THE DESCRIPTION

At least certain embodiments describe methods, apparatuses, and systems for converting energy from electro-magnetic (EM) radiation into electric power using a simultaneous collector of ambient radio frequencies (SCARF) circuit. In one embodiment this is done by capturing EM radiation from a plurality of ambient signals using an array of antennae where each signal has a resonant frequency and aggregating the ambient signals to generate an aggregated signal having a single frequency with greater AC power than the AC power of each of the plurality of ambient signals individually. The single frequency can be produced by either the sum of the resonant frequencies of the ambient signals or the difference between the resonant frequencies of the ambient signals. The aggregated signal is then converted into useable electric power using a rectifying circuit such that for every incremental increase in the AC power of the aggregated signal, there is a corresponding exponential increase in DC power at the output of the rectifying circuit.

BRIEF DESCRIPTION OF THE DRAWINGS

For a better understanding of at least certain embodiments, reference will be made to the following description, which is to be read in conjunction with the accompanying drawings, wherein.

DETAILED DESCRIPTION

Throughout the description, for the purposes of explanation, numerous specific details are set forth in order to provide a thorough understanding of the present invention. It will be apparent to one skilled in the art, however, that the present invention may be practiced without some of these specific details. In other instances, well-known structures and devices are shown in block diagram form to avoid obscuring the underlying principles of embodiments of the invention.

At least certain embodiments of the present invention describe methods, apparatuses, and systems for harvesting RF energy from ambient electromagnetic radiation, and converting that energy into useable electric power. Embodiments include simultaneously capturing electromagnetic radiation of multiple ambient RF or microwave signals using an array of antennae, each ambient signal having a different resonant frequency. The captured ambient signals are then combined to form an aggregated signal having a predetermined intermediate frequency and increased AC power. The aggregated signal is then converted into a useable DC power using a rectifying circuit.

The techniques disclosed herein are accomplished using a simultaneous collector of ambient radio frequencies (SCARF) circuit coupled with the rectifying circuit such that, for every incremental increase in the AC power of the aggregated signal, there is a corresponding exponential increase in DC power at the output of the rectifying circuit. In one embodiment, the SCARF circuit includes an array of antennae, a mixer coupled with the array of antennae, and a filter coupled with the mixer. This SCARF circuit is coupled with a rectifying circuit such that the DC power at the output of the rectifying circuit has a peak AC to DC power conversion.

Figure 1A:
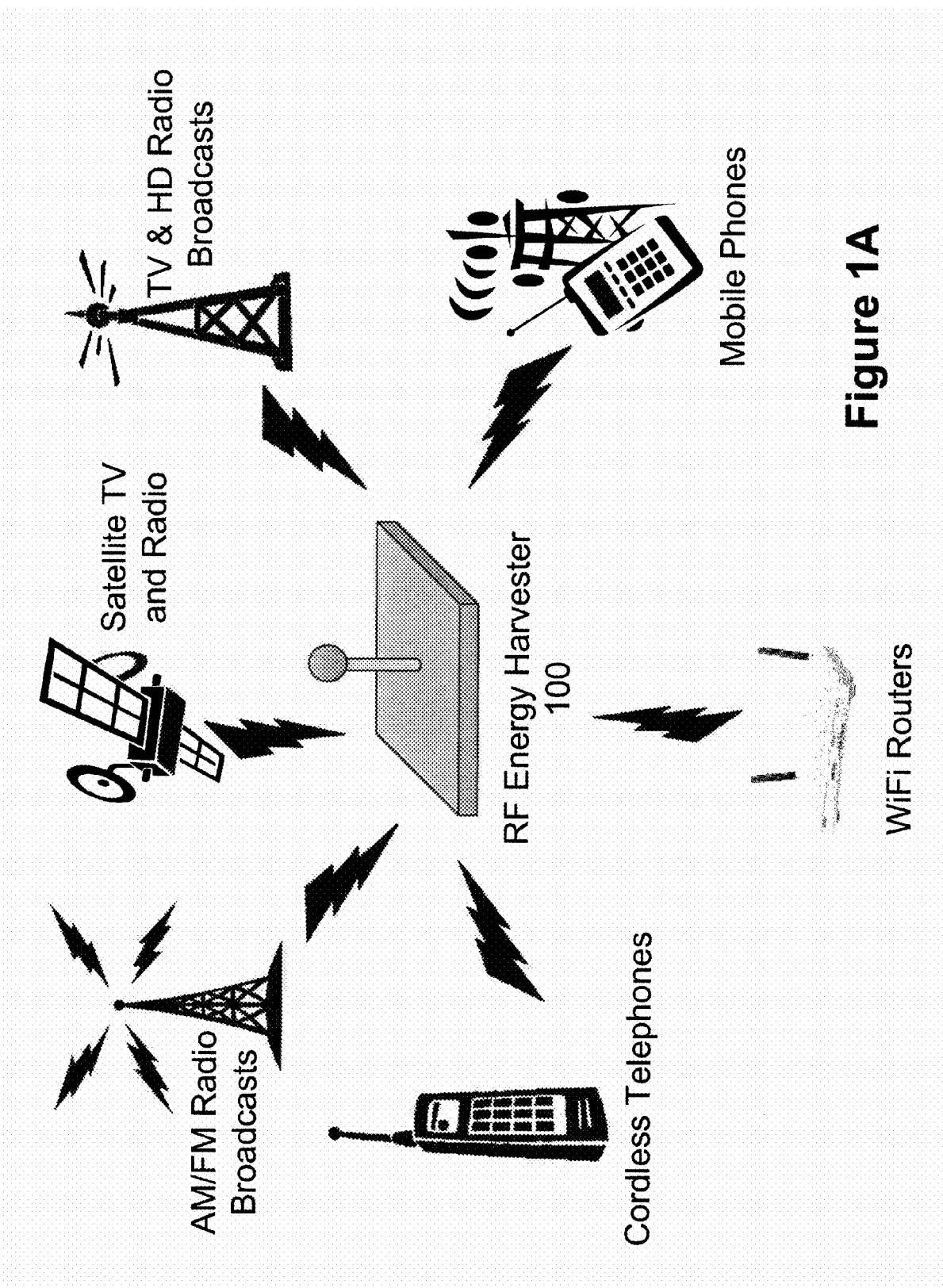
FIG. 1A depicts typical sources of ambient radio and microwave signals.

An advantage of the embodiments disclosed herein is that electromagnetic radiation existing in the ambient environment can be harvested and combined to produce usable DC electric energy to power electrical devices. Radio and microwave frequencies are ubiquitous in our everyday life. Signals with these frequencies are emitted from multiple sources including: television & radio towers; cellular base stations; WiFi routers; and satellite radio. Only a tiny fraction of the signals broadcast from these sources actually reach their intended targets, while the rest are dissipated in space. In a sense, this is free energy that is constantly being wasted. The SCARF circuit harvests this energy and puts it to use. FIG. 1A depicts the multiple sources of typical electromagnetic radiation that exists in the ambient environment. In the illustrated embodiment, RF energy harvester 100 is configured to receive at least some of the ambient electromagnetic signals from AM/FM radio broadcasts, satellite TV and radio, HD radio broadcasts, cordless telephones, mobile phones and cellular base stations, and wifi routers; and convert them into usable DC electric energy to power electronic devices. RF energy harvester 100 can provide power to wireless sensor nodes, mobile phones, portable MP3 players, portable electronics, and RF ID tags among others. The RF energy harvester 100 can replace batteries in these devices thus eliminating the waste produced from expended batteries. These devices may only need the techniques disclosed herein to power the device for its lifetime. For electronic devices that are not constantly in use and require more power than the RF energy harvester 100 can provide, the output from the RF energy harvester 100 can be used to trickle charge a small rechargeable battery; and this battery can then be used to power these electronic devices. This is an ideal configuration for mobile phones and larger wireless sensor nodes. Trickle charging can extend battery lifetime and the time between charges. The advantage that this RF energy harvester has over previous devices is that it can simultaneously collect multiple signals and aggregate the received AC power. This aggregated AC power is multiple times higher than would be collected from a single broadband antenna or from an antenna that collects only a single frequency signal.

Figure 1B:
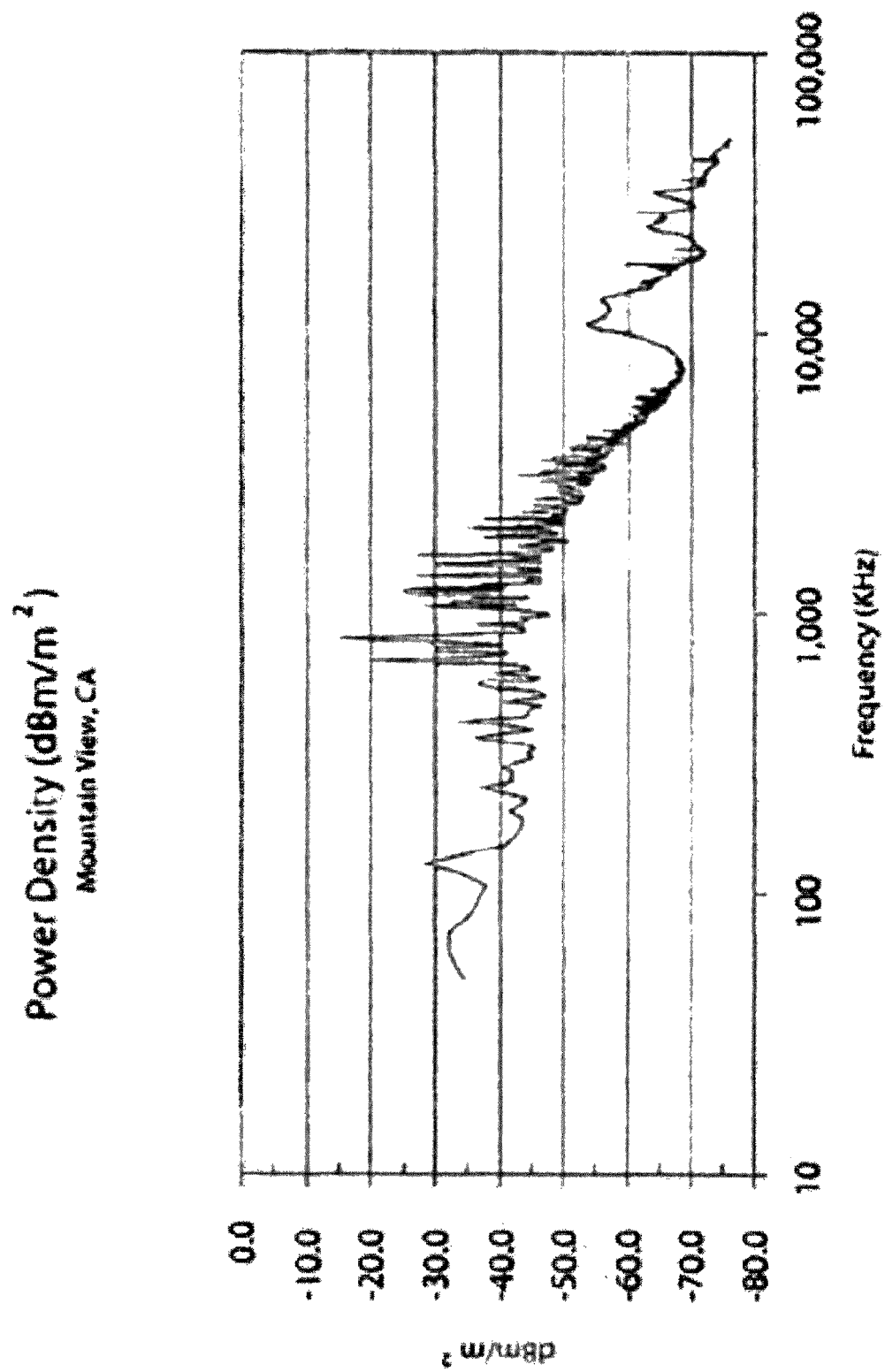
FIG. 1B depicts a graph of the ambient electromagnetic power density at different frequencies in Mountain View, Calif.

The data shown in FIG. 1B demonstrates the presence of a broadly distributed source of ambient electromagnetic energy in typical populated environments that can be harvested to provide a long term power source for electronic devices. The RF energy harvesting device 100 utilizes an array of antennae may be used to harvest these multiple RF and microwave frequency signals, and constructively combine them to produce a new signal with a higher AC power. The data shown in FIG. 1B shows a limited range of available electromagnetic sources, however the techniques introduced herein can utilize the entire electromagnetic spectrum. The array of antennae can be specifically designed to harvest signals having the greatest probability of being present in a particular ambient environment. Another advantage of the techniques introduced herein is that it is completely portable; and can be configured to be self-contained with minimal space requirements.

Figure 2:
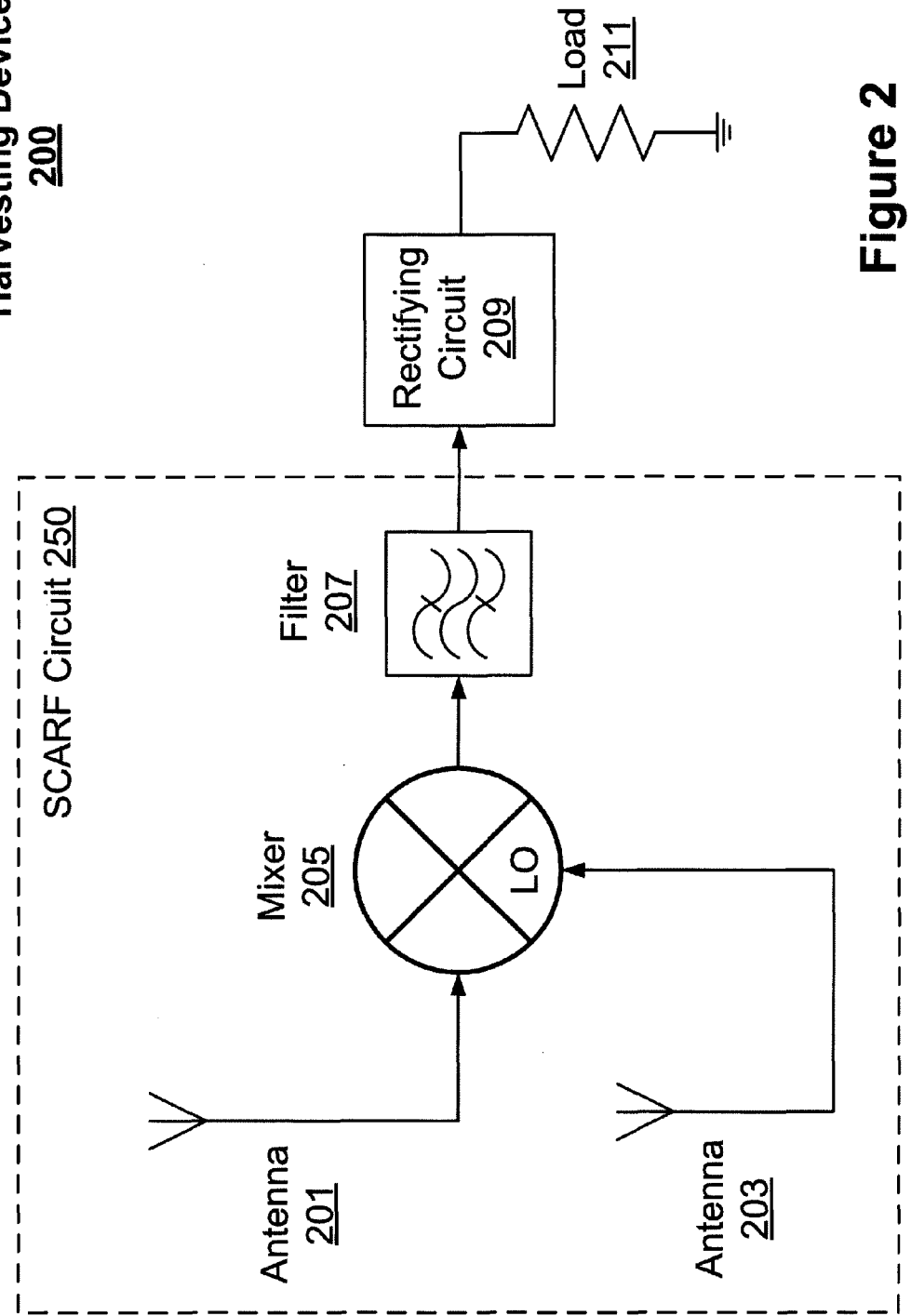
FIG. 2 depicts RF Energy Harvesting Device according to one illustrative embodiment.

FIG. 2 depicts an energy harvesting device according to one embodiment. In the illustrated embodiment, energy harvesting device 200 includes a SCARF circuit 250 coupled with a rectifying circuit 209. The SCARF circuit 250 includes an array of antennae including antenna 201 having a first resonant frequency and antenna 203 having a second resonant frequency different from the resonant frequency of antenna 201. These antennae are selected to provide a single predetermined intermediate frequency. One method for providing a single predetermined intermediate frequency is to couple the antenna with a filter to pass only the predetermined frequency. Antenna 201 and Antenna 203 are specifically selected to match the ambient frequencies with the highest power levels. For example, Antenna 201 can be designed with a resonant frequency of 1.9 GHz to match a Global System for Mobile Communications (GSM) transmission wavelength, while antenna 203 can be designed with a resonant frequency of 2.4 GHz to match a WiFi transmission wavelength.

SCARF circuit 250 further includes a mixer 205 coupled with each of antenna 201 and antenna 203. Mixer 205 is configured to aggregate the AC power of the resonant frequencies of antennae 201 and 203 and to output an aggregated signal having a single predetermined intermediate frequency that is either the sum of the resonant frequencies of antennae 201 and 203 or the difference between these resonant frequencies. As described herein, a mixer is defined as a non-linear circuit that accepts at its input two different frequencies and presents at its output a mixture of signals at several frequencies: the sum of the two frequencies; the difference of the two frequencies; both original input frequencies; and unwanted intermodulation products from the inputs.

SCARF circuit 250 also includes a filter 207 coupled at the output of mixer 205. The filter is configured to pass the intermediate frequency and to reject other frequencies. As used herein, the term filter is a device that removes from a signal some unwanted frequencies. As discussed above, SCARF circuit 250 is coupled with rectifying circuit 209. In at least certain embodiments, the rectifying circuit 209 is designed to match the intermediate frequency and to convert the aggregated signal into usable DC electric power. The rectifying circuit 209 receives the aggregated signal and outputs an output signal such that the DC power of the output signal has a peak AC to DC power conversion. The term rectifier describes a device that converts alternating current (AC) to direct current (DC), a process known as rectification. At low power levels, any increase in input power from the aggregated signal, produces exponentially greater AC to DC power conversion efficiencies. Rectifying circuits are well known in the field of RF engineering. Rectifying circuit 209 can be a half wave rectifier. A half-wave rectifier passes either the positive or negative half of an AC signal waveform. Half-wave rectification can be achieved with a single diode in a one phase supply. Rectifying circuit 209 can also be a full-wave rectifier. A full-wave rectifier converts the whole of the input waveform to one of constant polarity (positive or negative) at its output. Alternatively, rectification circuit 209 can be a voltage multiplying rectifier. Cascaded stages of diodes and capacitors can be added to make a voltage multiplying rectifier. Due to the nonlinearity of the diodes used in the rectification circuit, the combined signals with higher voltage peaks produce exponentially greater DC currents than those from prior art systems. Device 200 further includes load resistance 211 at the output of rectifying circuit 209 that represents the electronic device that receives the DC power, which may include, for example, a wireless sensor node or a cellular phone.

Figure 3A:
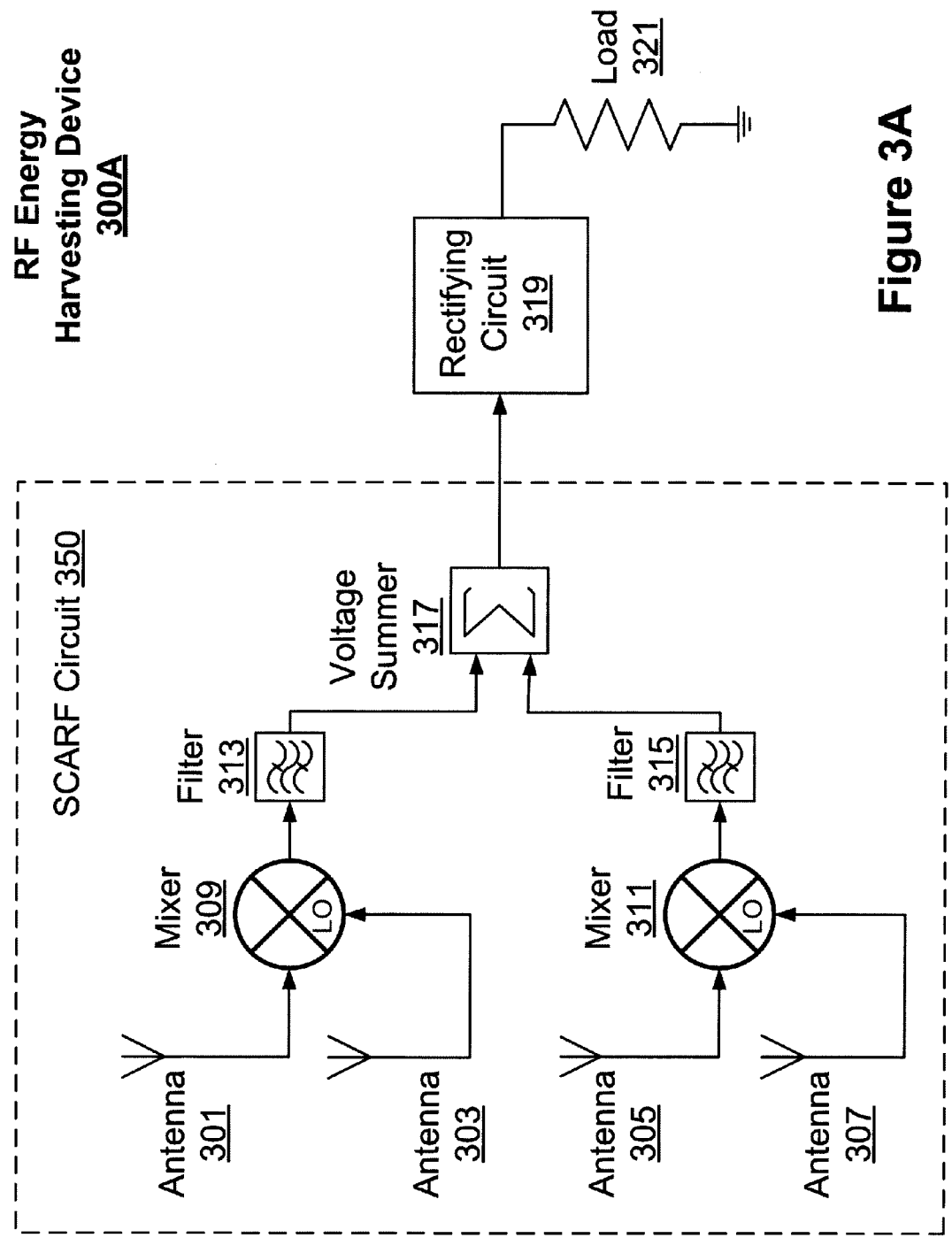
FIG. 3A depicts RF Energy Harvesting Device according to one illustrative embodiment.

The aggregated signal can either be converted to DC electricity directly using the rectifying circuit matched to the intermediate frequency of the aggregated signal as described in FIG. 2, or the aggregated signal can be combined with another signal (aggregated or not) to produce a new signal with even greater AC power. FIG. 3A depicts an RF energy harvesting device 300A according to one embodiment. In the illustrative embodiment, energy harvesting device 300A includes SCARF circuit 350 coupled with rectifying circuit 319. SCARF circuit 350 includes an additional mixer coupled with an additional filter, coupled with a voltage summer that combines the output from filter 313 with the output from filter 315. SCARF circuit 350 includes mixer 309 coupled with coupled with antenna 301 and antenna 303 and mixer 311 coupled with antenna 305 and 307. The additional antenna 305 and 307 are configured similarly to the antennae utilized in SCARF circuit 250 in FIG. 2. Voltage summer 317 is coupled between filter 313 and filter 315 and the rectifying circuit 319. The voltage summer 317 has an output that is the sum of the output of the first filter 313 and the output of the second filter 315. An advantage of doing the additional aggregation is that the AC power output from the voltage summer 317 is higher when the signals from filter 313 and filter 315 constructively interfere.

Device 300A further includes load resistance 321 at the output of rectifying circuit 319 that represents the electronic device which will receive the DC power. The antennae 301-307 in the array are predetermined so that the intermediate frequencies exiting filter 313 and filter 315 are equal. For example, if antennae 301 and 303 are 1.9 GHz and 2.4 GHz, respectively, and antennae 305 and 307 are 100 MHz and 400 MHz, respectively, the predetermined intermediate frequency output from filters 313 and 315 will be selected to be 500 MHz. In this example, the output intermediate frequency from filter 313 is the difference between the resonant frequencies from antennae 301 and 303, respectively; and the output intermediate frequency from filter 315 is the sum of the resonant frequencies from antennae 305 and 307, respectively.

Figure 3B:
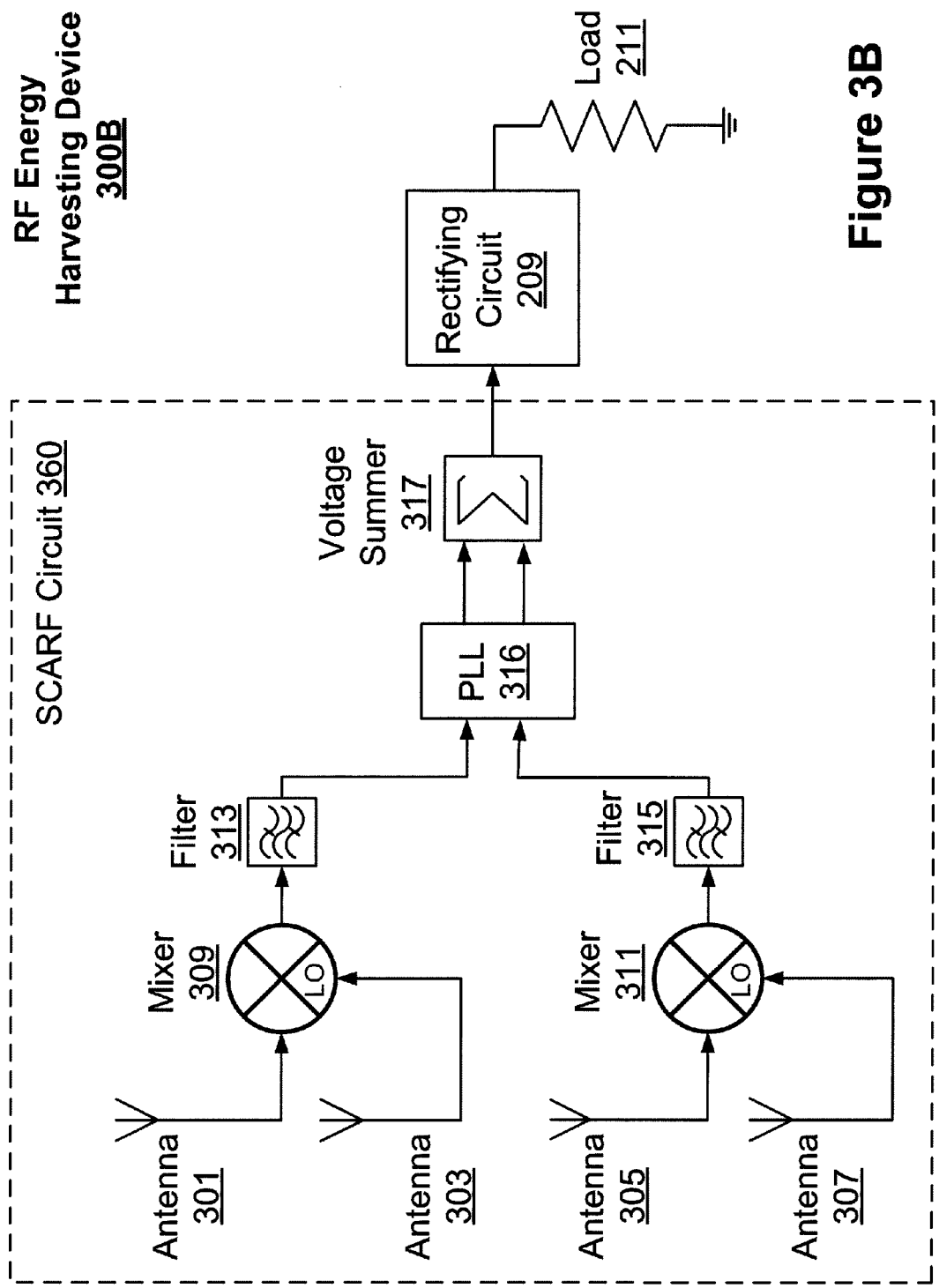
FIG. 3B depicts RF Energy Harvesting Device according to one illustrative embodiment.
Figure 3C:
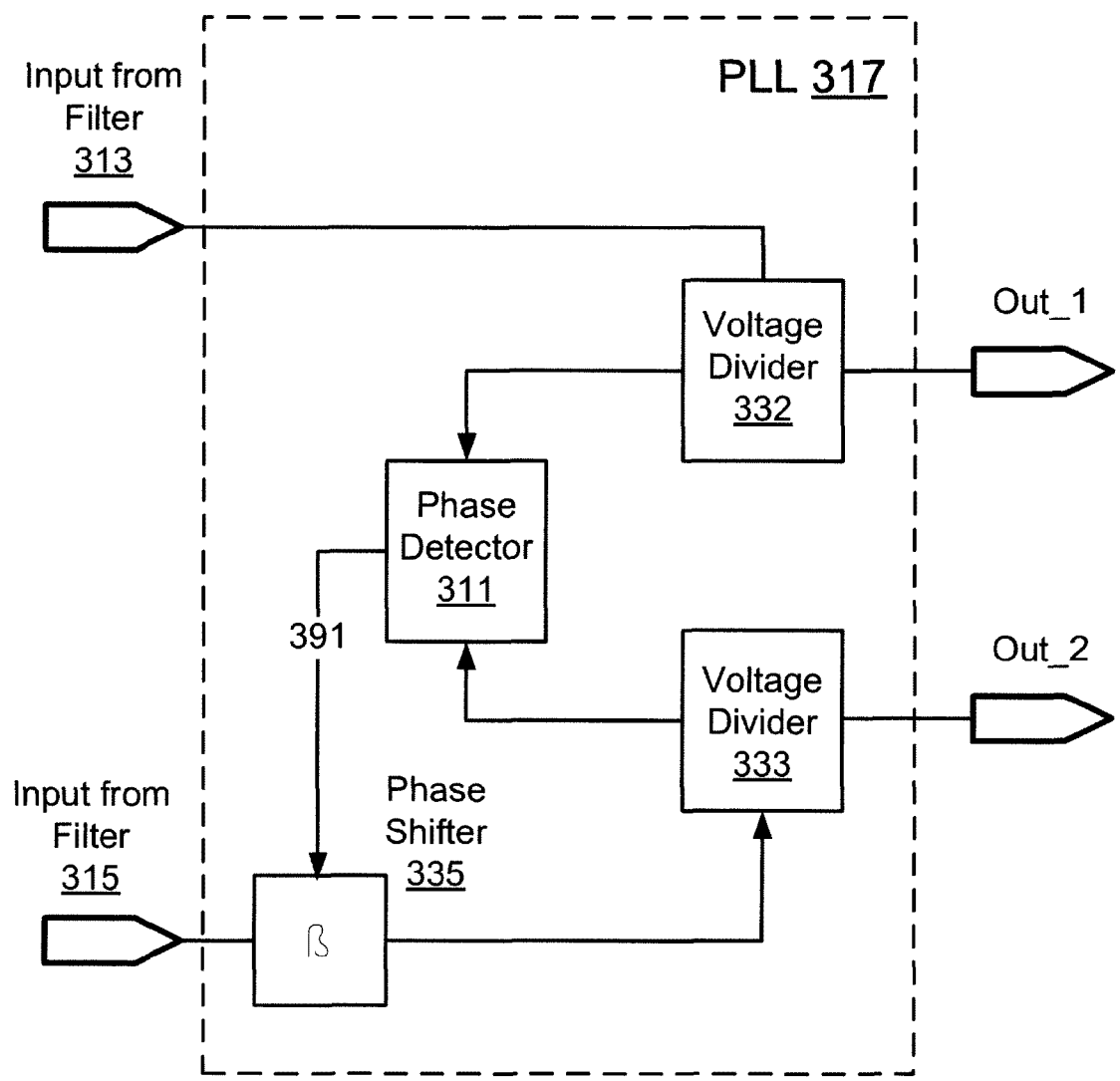
FIG. 3C depicts a phase-lock loop according to one illustrative embodiment.

A SCARF circuit 350 can further include a phase-lock loop (PLL) to ensure that the input signals into voltage summer 317 are in phase and are constructively interfering as depicted in FIG. 3B, in order to increase the AC power input into the rectifying circuit 319. In FIG. 3B, SCARF circuit 360 within RF energy harvesting device 300B includes a PLL 316 coupled between the outputs of filters 313 and 315 and the voltage summer 317. FIG. 3C depicts an illustrative PLL according to one embodiment. In this illustrated embodiment, PLL 316 includes a phase detector circuit configured to detect a phase difference between the input from filter 313 and the input from filter 315. PLL 316 further includes voltage divider 332 coupled between the input from filter 313 and the first input of phase detector 331. Voltage divider 332 is configured to provide a low-amplitude version of the intermediate frequency input from filter 313 to an input of phase detector 331. PLL 316 further includes voltage divider 333 coupled between the input from filter 315 and the second input of phase detector 331 as shown. Voltage divider 333 is configured to provide a low-amplitude version of the intermediate frequency output from filter 315 to an input of phase detector 331. PLL 316 also includes a phase shifter 335 coupled between the input from filter 315 and the voltage divider 333. The phase shifter 335 has a control input 391 which is coupled with the output of the phase detector circuit 331. The phase shifter 335 is configured such that the phase difference between the frequency input from filter 313 and the frequency input from filter 315 is zero. The DC output of the phase detector 331 acts as a control input 391 to phase shifter 335.

Figure 4:
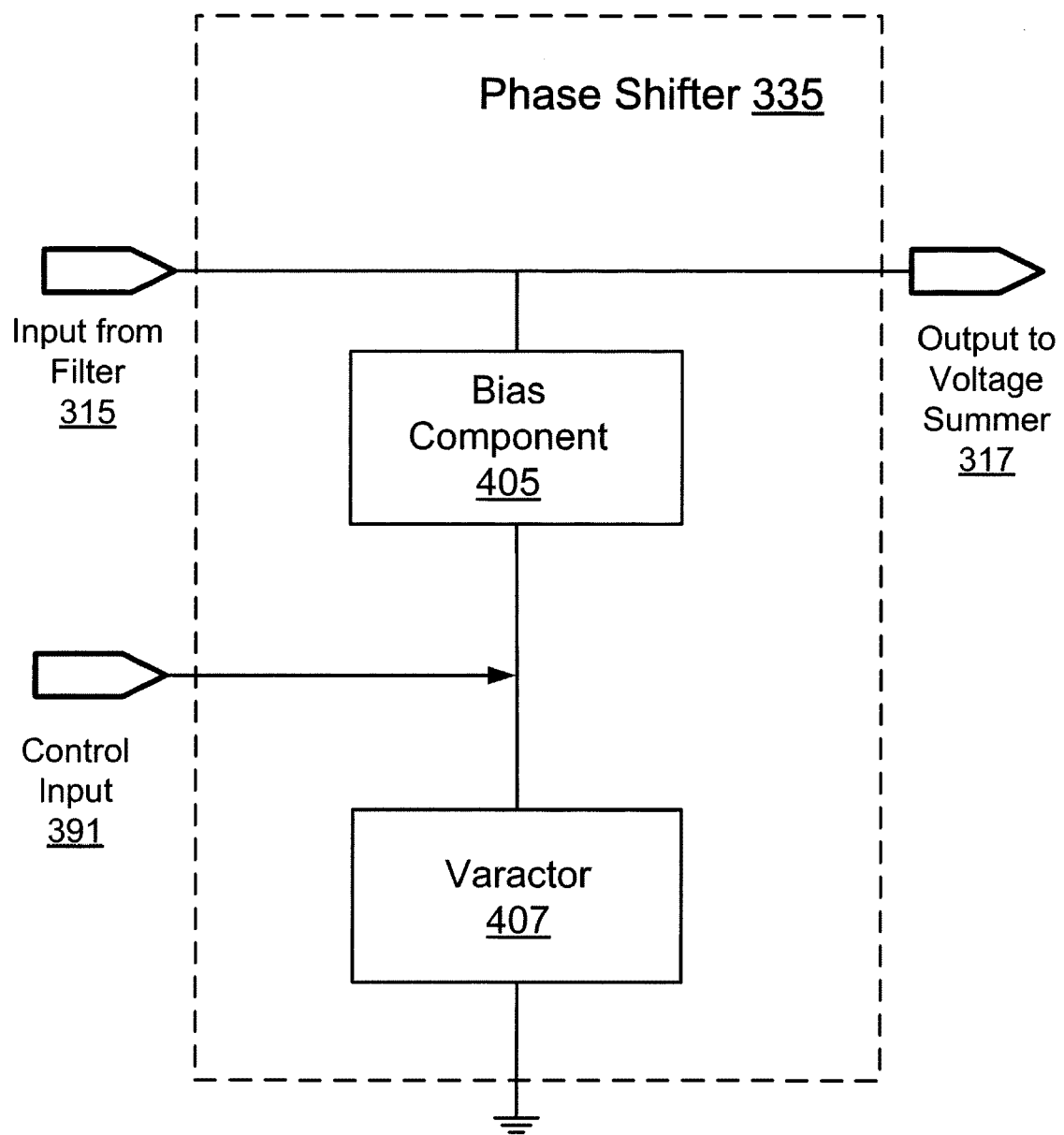
FIG. 4 depicts the Phase Shifter according to one illustrative embodiment.

FIG. 4 depicts a phase shifter according to one embodiment. In the illustrated embodiment, phase shifter 400 includes a varactor 407 coupled between the control input 391 from FIG. 3C and ground. As used herein, the term varactor is used to describe a type of diode which has a variable capacitance that is a function of the voltage impressed on its terminals. Phase shifter 400 further includes bias components 405 coupled between the control input 391 and the input from filter 315 from FIG. 3C.

Figure 5:
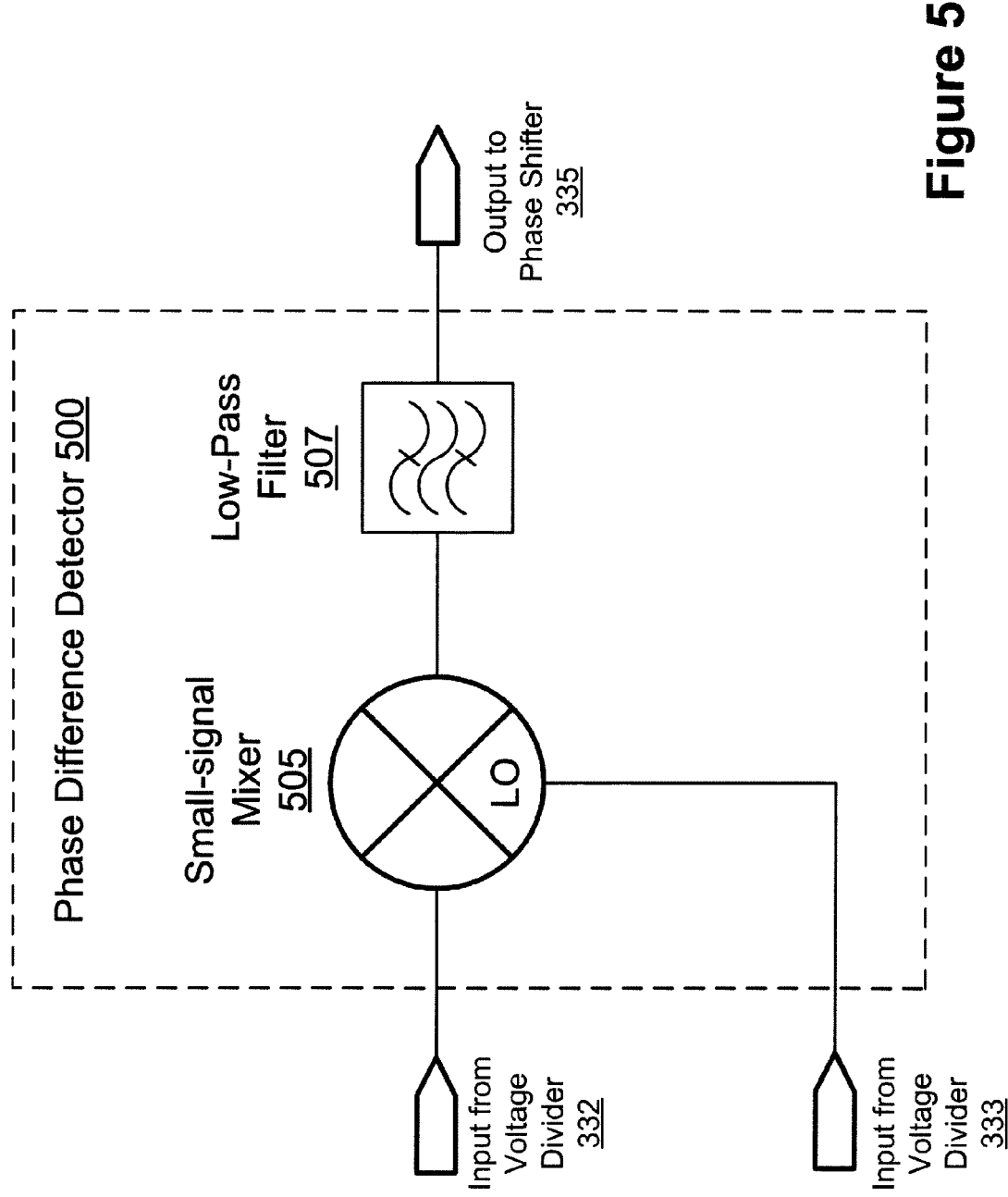
FIG. 5 depicts the Phase Difference Detector according to one illustrative embodiment.

FIG. 5 depicts a phase difference detector according to one embodiment. As used herein, the term phase difference detector refers to a frequency mixer circuit that generates a DC voltage signal representing the difference in phase between two signal inputs. In the illustrated embodiment, phase difference detector 500 includes a small-signal mixer 505 coupled with the output of voltage divider 332 and the output of voltage divider 333 of FIG. 3C. The small-signal mixer 505 produces a DC output voltage which is proportional to the phase difference of the two input signals from voltage dividers 332 and 333. The small-signal mixer 505 also produces an output AC signal with a frequency that is double the frequency of the two input signals, which is filtered out using low pass filter 507 coupled with the output of small-signal mixer 505. Accordingly, the output of low-pass filter 507 is the DC output voltage with the AC signal filtered out. This signal is output to phase shifter 400 depicted in FIG. 4.

Figure 6:
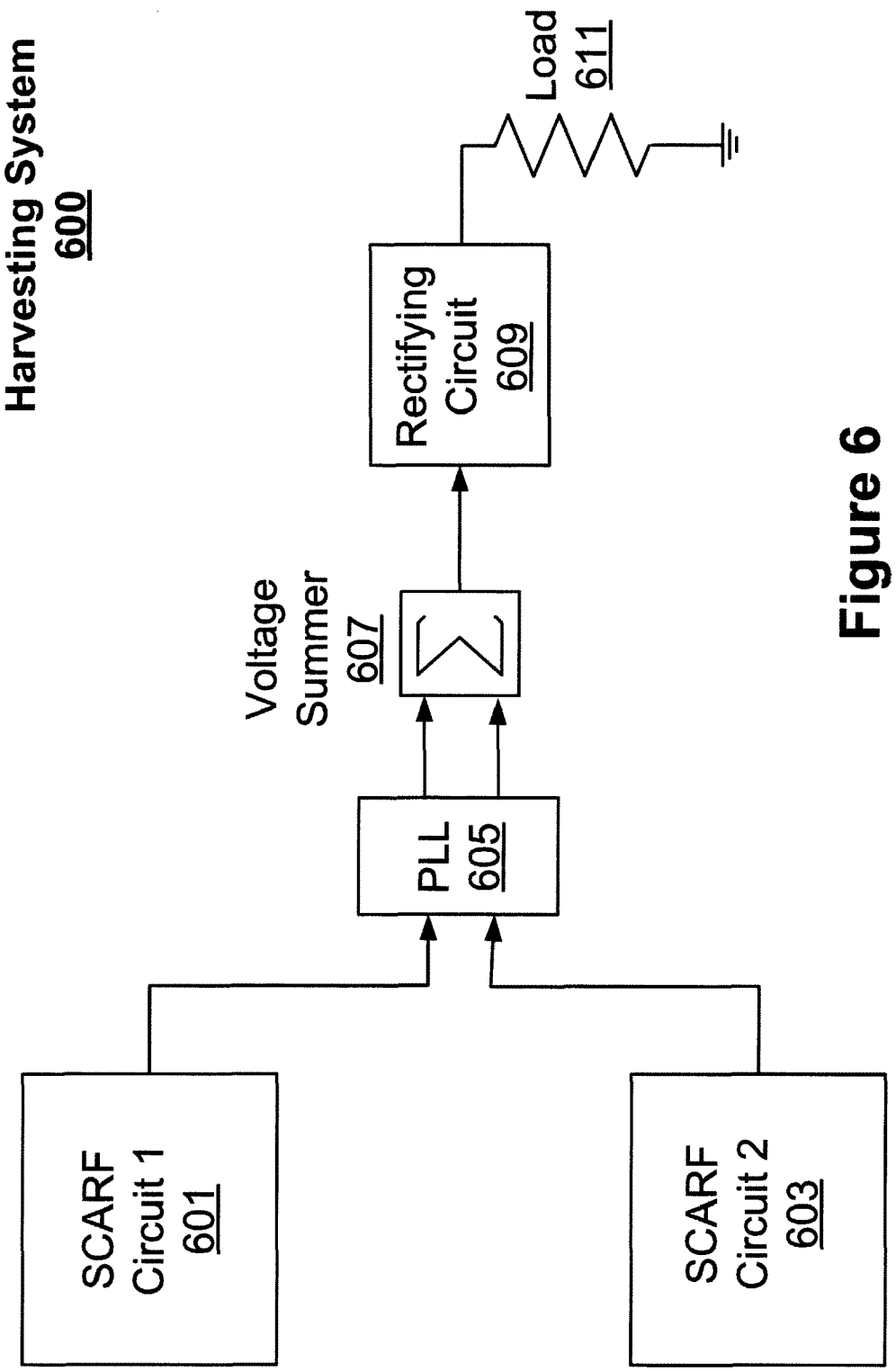
FIG. 6 depicts the RF Energy Harvesting System according to one illustrative embodiment.
Figure 9:
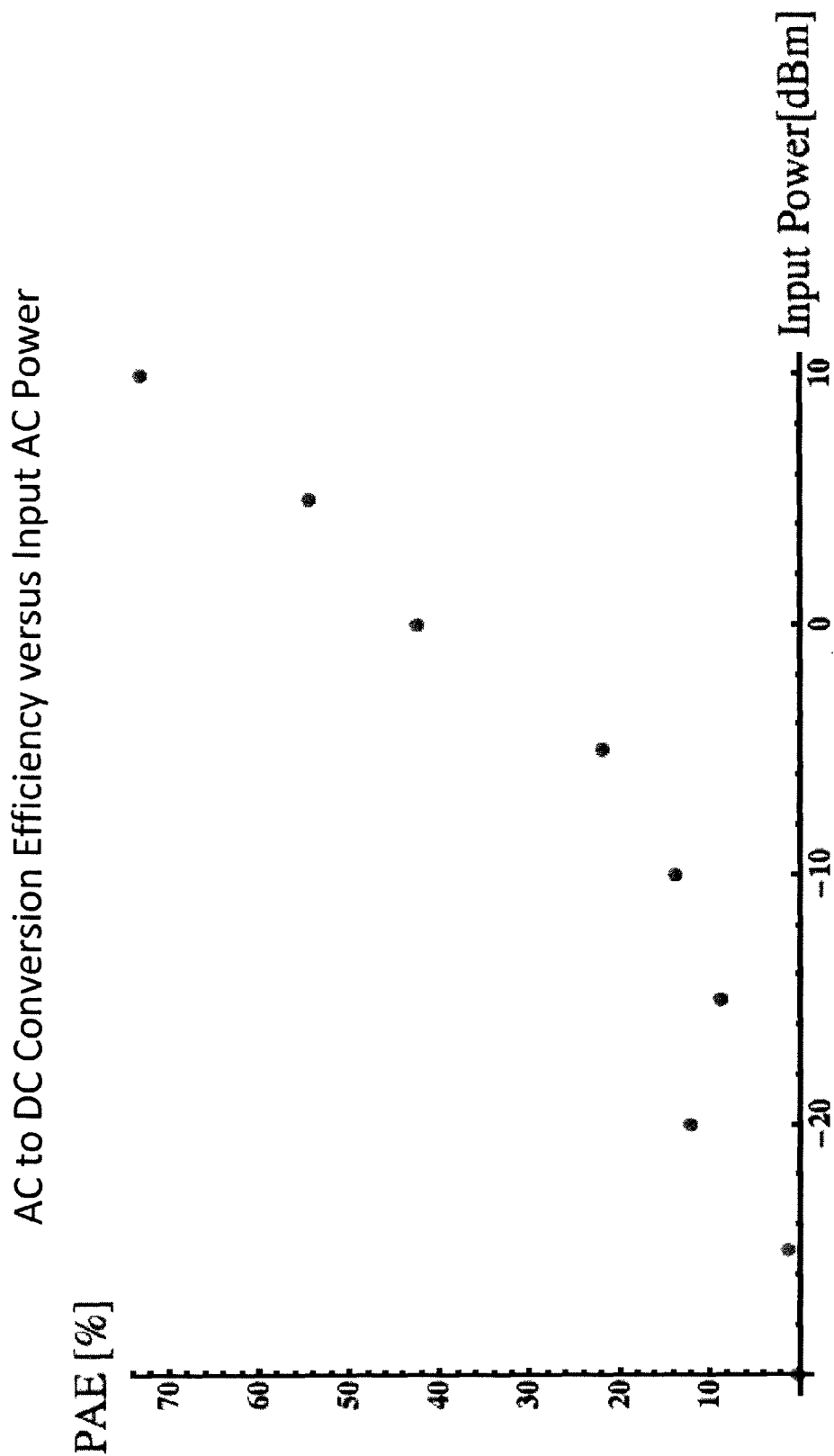
FIG. 9 depicts a graph of the exponential relationship between the input power to a rectifying circuit and the rectifying circuit's AC to DC power conversion according to one illustrative embodiment.

As shown in FIG. 6, the arrangement of the SCARF circuits depicted in FIGS. 3A-5 can be coupled together with a second SCARF circuit in order to increase the aggregated AC power, which in turn exponentially increases the AC to DC power conversion efficiency of the rectification circuit as depicted in FIG. 9. In the illustrated embodiment, the output of SCARF Circuit 601 is coupled with the first input of a second-level PLL 605 and the output of SCARF Circuit 603 is coupled with the second input of second-level PLL 605. The output of second-level PLL 605 is connected to the input of a second-level voltage summer 607. The output of second-level voltage summer 607 is connected to the input of rectifying circuit 609, which is connected to load resistance 611.

Figure 7:
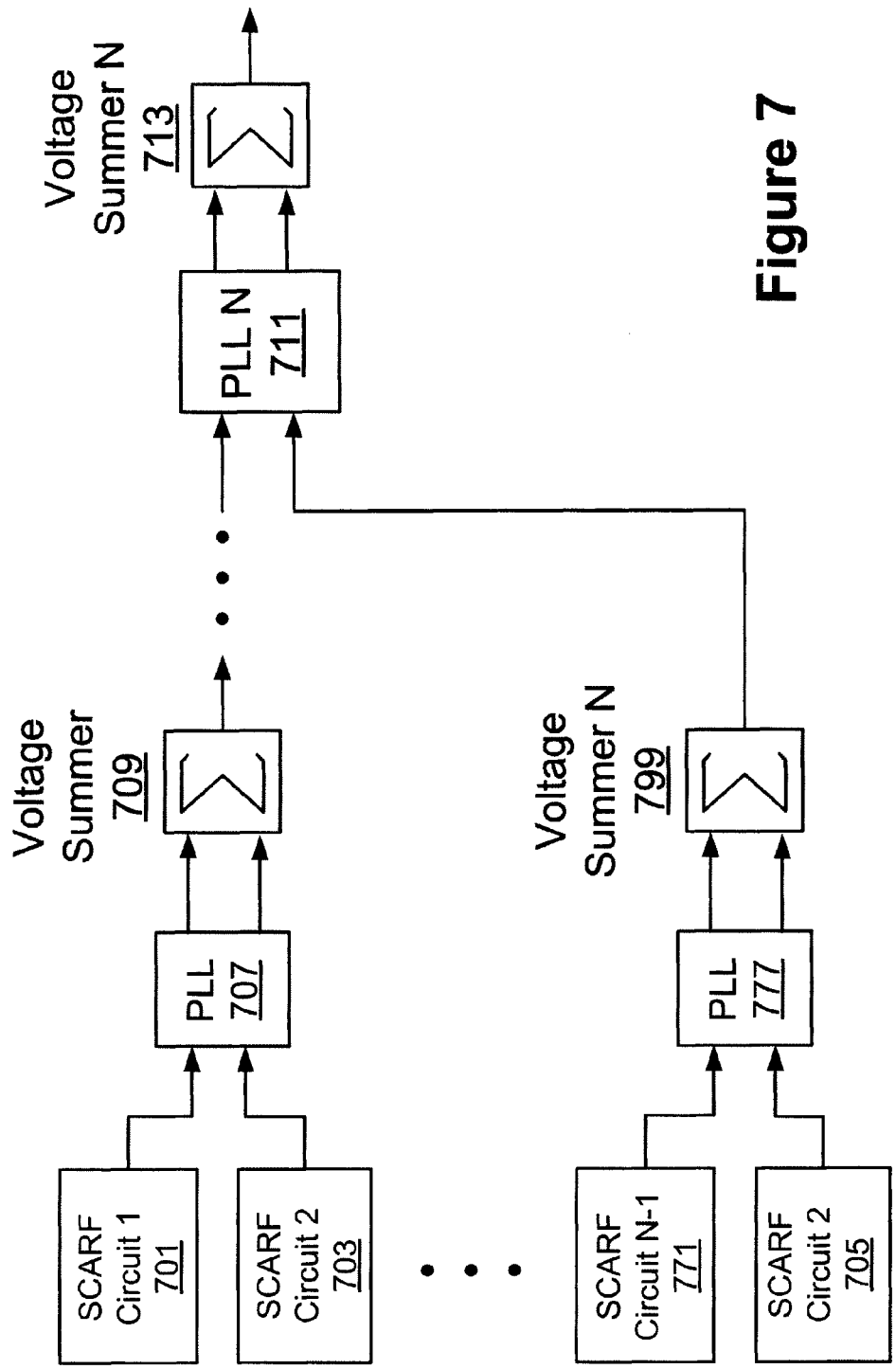
FIG. 7 depicts the RF Energy Harvesting System according to one illustrative embodiment.

FIG. 7 depicts an energy harvesting system 700 according to one embodiment. As illustrated, this technique can be generalized to N pairs of SCARF circuits, each pair having an associated additional level of PLL and voltage summer circuits. In at least certain embodiments, for every pair of SCARF circuits coupled together in the system, an additional level of PLL and voltage summer circuits must be added. As discussed above, the techniques introduced here are advantageous for harvesting RF energy from ambient electromagnetic radiation, and converting that energy into useable electric power. Embodiments include: simultaneously capturing electromagnetic radiation from multiple ambient RF or microwave signals using an array of antennae, each signal having a different resonant frequency; aggregating the multiple ambient RF or microwave signals, the aggregated signal having a predetermined intermediate frequency and increased AC power; and converting that aggregated signal into a useable DC power using a rectifying circuit. The techniques disclosed herein are accomplished using a simultaneous collector of ambient radio frequencies (SCARF) circuit coupled with a rectifying circuit such that for every incremental increase in the AC power of the aggregated signal, there is a corresponding exponential increase in AC to DC power conversion efficiency of the rectifying circuit.

Figure 8:
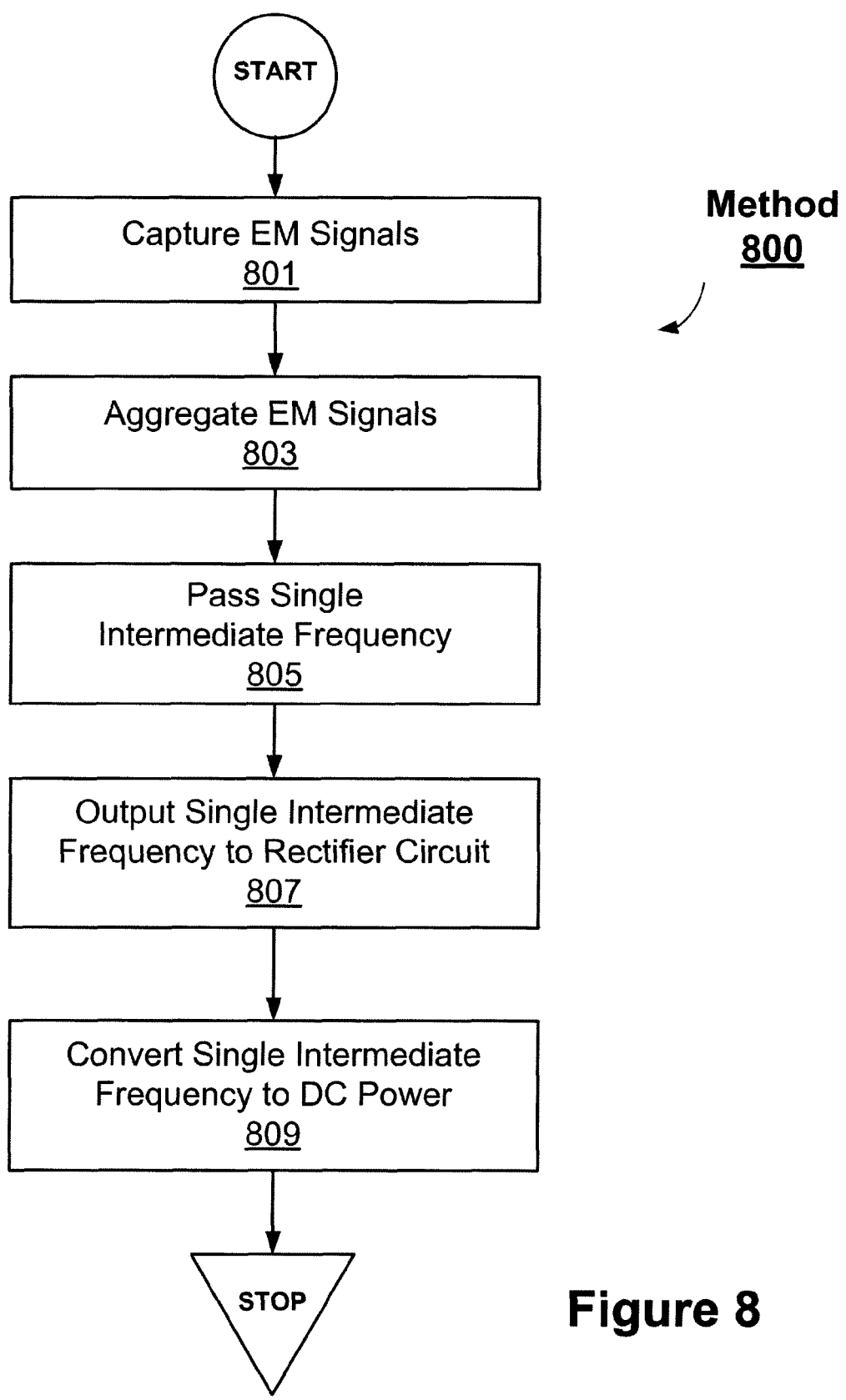
FIG. 8 depicts method for RF Energy Harvesting according to one illustrative embodiment.

FIG. 8 depicts a method of harvesting RF energy according to one embodiment. In the illustrated embodiment, method 800 begins at operation 801 where electromagnetic signals are captured using a SCARF device. As discussed above, the various antennae may be selected to provide an intermediate frequency to maximize the AC to DC power conversion. Method 800 continues at operation 803 where the captured signals are aggregated. In one embodiment, this may be accomplished using a mixer as described with respect to FIG. 3A. The aggregated signal is then input into a filter to pass a single intermediate frequency signal and reject other frequency signals (operation 805). The single intermediate frequency signal is then converted to useable electric power (operation 809), which can be used to charge an electronic device or battery. This concludes method 800.

Figure 10:
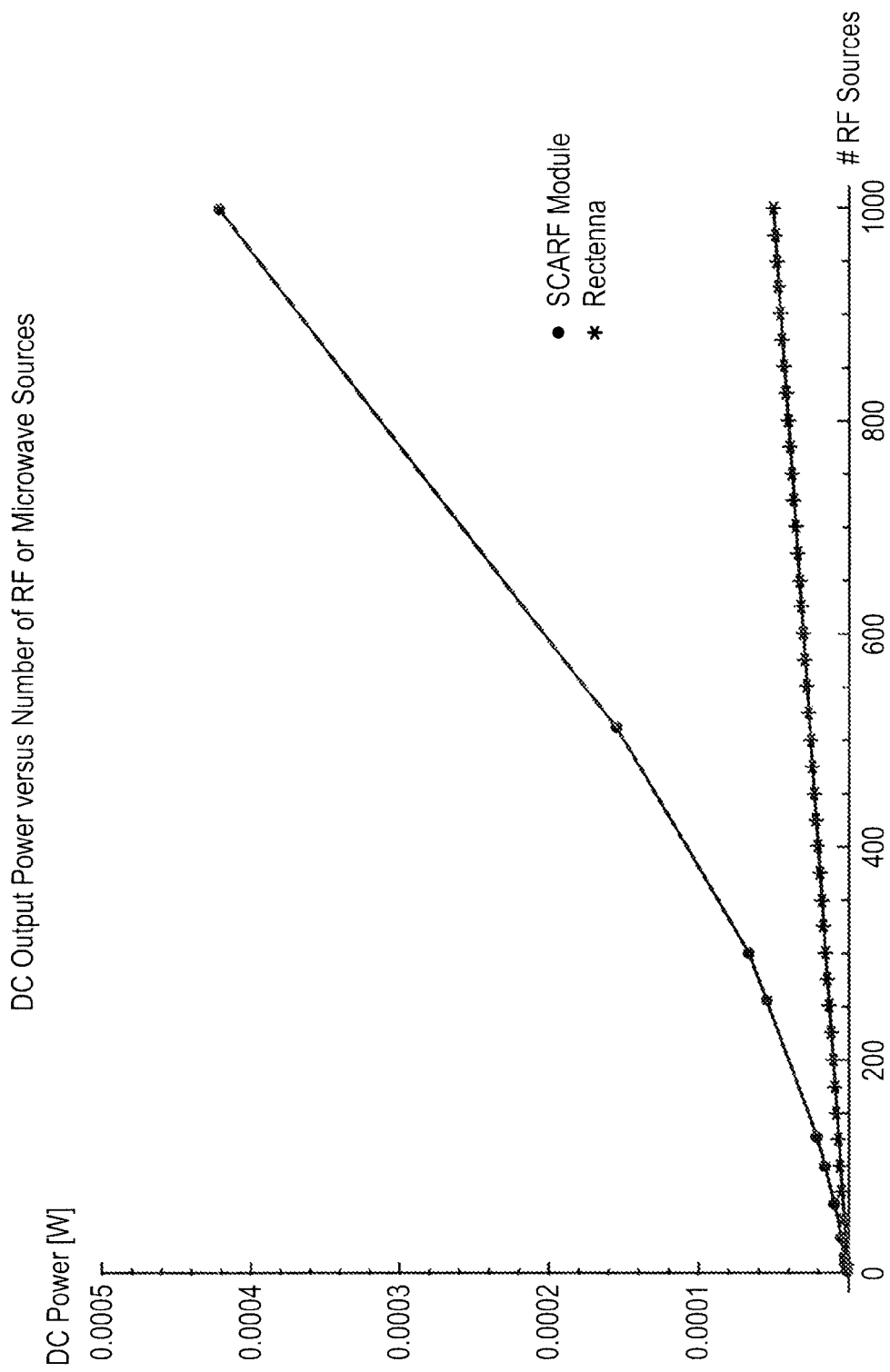
FIG. 10 depicts the projected DC power output from an RF Energy Harvesting Device implemented using the techniques described herein in comparison to the projected DC power output from prior art high-efficiency rectennas.

FIG. 9 depicts the efficiency of the rectifying circuit, showing a graph of the exponential relationship between the input power to a rectifying circuit and the rectifying circuit's AC to DC power conversion according to one illustrative embodiment. The efficiency of the rectifying circuit increases exponentially as the magnitude of the input AC voltage increases. And FIG. 10 depicts the benefit of the RF energy harvesting described herein, showing the projected DC power output from an RF energy harvesting device implemented using the techniques described herein in comparison to the projected DC power output from prior art high-efficiency rectennas. In the illustrated embodiment, one set of points depicts a numerical approximation of the DC Output power from high-efficiency rectennas. The graph illustrates that the DC output power from the rectennas linearly increases as the number of received RF signals increases. The other set of points in FIG. 10 depicts the numerical approximation of the DC output from an RF Energy Harvester implemented according to the techniques described herein. The DC output power from method 800 increases exponentially as the number of received RF signals increases. This exponential increase in DC output power is due to the exponential increase in AC to DC power conversion efficiency of the rectifying circuit as depicted in FIG. 9.

Throughout the foregoing description, for the purposes of explanation, numerous specific details were set forth in order to provide a thorough understanding of the invention. It will be apparent, however, to one skilled in the art that the invention may be practiced without some of these specific details. In addition, embodiments of the invention may include various operations as set forth above, or fewer operations or more operations, or operations in an order which is different from the order described herein. Accordingly, the scope and spirit of the invention should be judged in terms of the claims which follow as well as the legal equivalents thereof.

What is claimed is:

1. A method of converting RF energy from ambient electromagnetic (EM) radiation into useable electric power using a simultaneous collector of ambient radio frequencies (SCARF) circuit, the method comprising:
    simultaneously capturing EM radiation from a plurality of ambient RF or microwave signals using an array of antennae having at least two antennae, each signal having a different resonant frequency;
    aggregating the plurality of ambient signals to generate an aggregated signal having a single predetermined intermediate frequency signal with greater AC power than AC power of each of the plurality of ambient signals individually, wherein the single predetermined intermediate frequency is either a sum of the resonant frequencies of the plurality of ambient signals or a difference between the resonant frequencies of the plurality of ambient signals; and
    converting the aggregated signal into useable electric power using a rectifying circuit, wherein for every incremental increase in the AC power of the aggregated signal, there is a corresponding exponential increase in DC power at the output of the rectifying circuit.

2. The method of claim 1, further comprising optimizing the rectifying circuit to match the single predetermined intermediate frequency and to generate an output signal such that DC power of the output signal has a peak AC to DC power conversion.

3. The method of claim 2, further comprising:
    selecting a first antenna having a first resonant frequency and a second antenna having a second resonant frequency different from the first resonant frequency, wherein the first and the second antennae are selected to provide a single predetermined intermediate frequency optimized for the rectifying circuit coupled at an output of the SCARF circuit;
    aggregating the first and second resonant frequencies using a first mixer within the SCARF circuit to generate the single predetermined intermediate frequency, wherein the first mixer includes a first input coupled with the first antenna and a second input coupled with the second antenna, and wherein the single predetermined intermediate frequency is either a sum of the first and second resonant frequencies or a difference between the first and second resonant frequencies; and
    passing the single predetermined intermediate frequency and rejecting other frequencies using a first filter coupled with an output of the first mixer.

4. The method of claim 3, further comprising:
    selecting a third antenna having a third resonant frequency and a fourth antenna having a fourth resonant frequency different from the third resonant frequency, wherein the third and fourth antennae are selected to provide the single predetermined intermediate frequency optimized for the rectifying circuit at the output of the SCARF circuit; and
    aggregating the third and fourth resonant frequency using a second mixer within the SCARF circuit to generate the single predetermined intermediate frequency, wherein the second mixer includes a first input coupled with the third antenna and a second input coupled with the fourth antenna, and wherein the single predetermined intermediate frequency is either a sum of the third and fourth resonant frequencies or a difference between the third and fourth resonant frequencies; and
    passing the single predetermined intermediate frequency and rejecting other frequencies using a second filter coupled with an output of the second mixer.

5. The method of claim 4, further comprising transferring a sum of the output of the first filter and the second filter to the rectifying circuit using a voltage summer coupled between the first and second filters and the rectifying circuit, wherein the voltage summer includes a first input coupled with an output of the first filter and a second input coupled with the output of the second filter, and an output coupled with an input of the rectifying circuit.

6. The method of claim 5, wherein the SCARF circuit further comprises a phase lock loop coupled between the outputs of the first and second filters and the voltage summer.

7. The method of claim 6, wherein the phase lock loop comprises:
    a phase detector circuit configured to detect a phase difference between the output of the first filter and the output of the second filter;
    a first voltage divider coupled between the output of the first filter and a first input of the phase detector circuit, the first voltage divider configured to provide a first low-amplitude version of the single predetermined intermediate frequency to the first input of the phase detector circuit;
    a second voltage divider coupled between the output of the second filter and a second of input of the phase detector circuit, the second voltage divider configured to provide a second low-amplitude version of the single predetermined intermediate frequency to the second input of the phase detector circuit; and
    a phase shifter coupled between the output of the second filter and the second voltage divider, the phase shifter having an input coupled with the output of the phase detector circuit, wherein the phase shifter is configured such that a phase between an output frequency of the first filter and an output frequency of the second filter is zero.

8. The method of claim 7, wherein the phase detector circuit includes a small-signal mixer coupled with a low pass filter and the phase shifter includes a varactor phase shifter.

9. The method of claim 6, further comprising coupling together a plurality of pairs SCARF circuits, wherein each pair of SCARF circuits is coupled together such that an output of a first of the pair of SCARF circuits is coupled with a first input of a second-level phase lock loop and an output of a second of the pair of SCARF circuits is coupled with a second input of the second-level phase lock loop, wherein an output of the second-level phase lock loop is coupled with an input of a second-level voltage summer, and wherein an output of the second-level voltage summer is coupled with the input of the rectifying circuit.

10. An RF energy harvesting device configured to convert energy from ambient electro-magnetic (EM) radiation into useable electric power, the RF energy harvesting device comprising:
 a simultaneous collector of ambient radio frequencies (SCARF) circuit including:
  (1) an antennae array having at least two antennae, the antennae array configured to simultaneously capture EM radiation from a plurality of ambient RF or microwave signals, each signal having a different resonant frequency; and
  (2) an aggregation circuit configured to aggregate the plurality of ambient signals to generate an aggregated signal having a single predetermined intermediate frequency with greater AC power than the AC power of each of the plurality of ambient signals individually, wherein the single predetermined intermediate frequency is either a sum of the resonant frequencies of the plurality of ambient signals or a difference between the resonant frequencies of the plurality of ambient signals; and
 a rectifying circuit configured to convert the aggregated signal into useable electric power, wherein for every incremental increase in the AC power of the aggregated signal, there is a corresponding exponential increase in DC power at the output of the rectifying circuit.

11. The RF energy harvesting device of claim 10, wherein the rectifying circuit is coupled with an output of the first filter, the rectifying circuit configured to:
 match the single predetermined intermediate frequency; and
 generate an output signal such that DC power of the output signal has a peak AC to DC power conversion.

12. The RF energy harvesting device of claim 10, wherein the SCARF circuit further comprises:
 (1) the antenna array having a first antenna and a second antenna, wherein the first antenna is configured to capture a first signal having a first resonant frequency and the second antenna is configured to capture a second signal having a second resonant frequency different from the first resonant frequency, wherein the first and second antennae are selected to provide the single predetermined intermediate frequency optimized for the rectifying circuit;
 (2) a first mixer coupled with each of the first and second antennae, the first mixer configured to aggregate the resonant frequencies of the first and second signals and to generate an aggregated signal having the single predetermined intermediate frequency with greater AC power than the AC power of each of the first and second signals individually, wherein the single predetermined intermediate frequency is either the sum of the first and second resonant frequencies or the difference between the first and second resonant frequencies; and
 (3) a first filter coupled with an output of the first mixer, the first filter configured to pass the single predetermined intermediate frequency and to reject other frequencies.

13. The RF energy harvesting device of claim 12, wherein the SCARF circuit further comprises:
 (4) a third antenna having a third resonant frequency and a fourth antenna having a fourth resonant frequency different from the first, second, and third resonant frequencies, wherein the third and fourth antennae are selected to provide the single predetermined intermediate frequency optimized for the rectifying circuit;
 (5) a second mixer coupled with outputs of each of the third and fourth antennae, the second mixer configured to aggregate the resonant frequencies of the third and fourth signals and to generate an aggregated signal having the single predetermined intermediate frequency with greater AC power than the AC power of each of the third and fourth signals individually, wherein the single predetermined intermediate frequency is either the sum of the third and fourth resonant frequencies or the difference between the third and fourth resonant frequencies; and
 (6) a second filter coupled with an output of the second mixer, the second filter configured to pass the single predetermined intermediate frequency and to reject other frequencies.

14. The RF energy harvesting device of claim 13, further comprising a voltage summer coupled between the first and second filters and the rectifying circuit, the voltage summer having a first input coupled with an output of the first filter and a second input coupled with the output of the second filter, wherein the output of the voltage summer produces a sum of the outputs of the first and second filters.

15. The RF energy harvesting device of claim 14, further comprising a phase lock loop coupled between the outputs of the voltage summer and the first and second filters.

16. The RF energy harvesting device of claim 15, wherein the phase lock loop comprises:
 a phase detector circuit configured to detect a phase difference between the output of the first filter and the output of the second filter;
 a first voltage divider coupled between the output of the first filter and a first input of the phase detector circuit, the first voltage divider configured to provide a first low-amplitude version of the single predetermined intermediate frequency to the first input of the phase detector circuit;
 a second voltage divider coupled between the output of the second filter and a second input of the phase detector circuit, the second voltage divider configured to provide a second low-amplitude version of the single predetermined intermediate frequency to the second input of the phase detector circuit; and
 a phase shifter coupled between the output of the second filter and the second voltage divider, the phase shifter having an input coupled with the output of the phase detector circuit, wherein the phase shifter is configured such that a phase between an output frequency of the first filter and an output frequency of the second filter is zero.

17. The RF energy harvesting device of claim 16, wherein the phase detector circuit includes a small-signal mixer coupled with a low pass filter, and the phase shifter includes a varactor phase shifter.

18. The RF energy harvesting device of claim 15, further comprising a plurality of pairs of SCARF circuits, wherein each pair of SCARF circuits is coupled together such that the output of a first of the pair of SCARF circuits is coupled with a first input of a second-level phase lock loop and the output of a second of the pair of SCARF circuits is coupled with a second input of the second-level phase lock loop, and wherein an output of the second-level phase lock loop is coupled with an input of a second-level voltage summer, and wherein an output of the second-level voltage summer is coupled with the input of the rectifying circuit.

19. A system having a first simultaneous collector of ambient radio frequencies (SCARF) circuit coupled with a second SCARF circuit, wherein each SCARF circuit comprises:
    an antennae array having at least two antennae, the antennae array configured to simultaneously capture EM radiation from a plurality of ambient RF or microwave signals, each signal having a different resonant frequency; and
    an aggregation circuit configured to aggregate the plurality of ambient signals to generate an aggregated signal having a single predetermined intermediate frequency with greater AC power than AC power of each of the plurality of ambient signals individually, wherein the single predetermined intermediate frequency is either a sum of the resonant frequencies of the plurality of ambient signals or a difference between the resonant frequencies of the plurality of ambient signals.

20. The system of claim 19, further comprising a rectifying circuit coupled to outputs of the first and second SCARF circuits, the rectifying circuit configured to:
    match the single predetermined intermediate frequency; and
    generate an output signal such that DC power of the output signal has a peak AC to DC power conversion.

21. The system of claim 19, wherein each SCARF circuit further comprises:
    (1) the antenna array having a first antenna and a second antenna, wherein the first antenna is configured to capture a first signal having a first resonant frequency and the second antenna is configured to capture a second signal having a second resonant frequency different from the first resonant frequency, wherein the first and second antennae are selected to provide the single predetermined intermediate frequency optimized for the rectifying circuit;
    (2) a first mixer coupled with each of the first and second antennae, the first mixer configured to aggregate the resonant frequencies of the first and second signals and to generate an aggregated signal having the single predetermined intermediate frequency with greater AC power than the AC power of each of the first and second signals individually, wherein the single predetermined intermediate frequency is either the sum of the first and second resonant frequencies or the difference between the first and second resonant frequencies; and
    (3) a first filter coupled with an output of the first mixer, the first filter configured to pass the single predetermined intermediate frequency and to reject other frequencies.

22. The system of claim 21, wherein each SCARF circuit further comprises:
    (4) a third antenna having a third resonant frequency and a fourth antenna having a fourth resonant frequency different from the first, second, and third resonant frequencies, wherein the third and fourth antennae are selected to provide the single predetermined intermediate frequency optimized for the rectifying circuit;
    (5) a second mixer coupled with outputs of each of the third and fourth antennae, the second mixer configured to aggregate the resonant frequencies of the third and fourth signals and to generate an aggregated signal having the single predetermined intermediate frequency with greater AC power than the AC power of each of the third and fourth signals individually, wherein the single predetermined intermediate frequency is either the sum of the third and fourth resonant frequencies or the difference between the third and fourth resonant frequencies; and
    (6) a second filter coupled with an output of the second mixer, the second filter configured to pass the single predetermined intermediate frequency and to reject other frequencies.

23. The system of claim 22, further comprising a voltage summer coupled between the first and second filters and the rectifying circuit, the voltage summer having a first input coupled with an output of the first filter and a second input coupled with the output of the second filter, wherein the output of the voltage summer produces a sum of the outputs of the first and second filters.

24. The system of claim 23, wherein each SCARF circuit further comprises a phase lock loop coupled between the voltage summer and the outputs of the first and second filters.

25. The system of claim 24, wherein the phase lock loop of each SCARF circuit comprises:
    a phase detector circuit configured to detect a phase difference between the output of the first filter and the output of the second filter;
    a first voltage divider coupled between the output of the first filter and a first input of the phase detector circuit, the first voltage divider configured to provide a first low-amplitude version of the single predetermined intermediate frequency to the first input of the phase detector circuit;
    a second voltage divider coupled between the output of the second filter and a second input of the phase detector circuit, the second voltage divider configured to provide a second low-amplitude version of the single predetermined intermediate frequency to the second input of the phase detector circuit; and
    a phase shifter coupled between the output of the second filter and the second voltage divider, the phase shifter having an input coupled with the output of the phase detector circuit, wherein the phase shifter is configured such that a phase between an output frequency of the first filter and an output frequency of the second filter is zero.

26. The system of claim 25, wherein the phase detector circuit for each SCARF circuit includes a small-signal mixer coupled with a low pass filter and the phase shifter includes a varactor phase shifter.

27. The system of claim 26, wherein the rectifying circuit for each SCARF circuit is selected from the group consisting of:
    a half-wave rectifying circuit optimized for high frequencies;
    a full-wave rectifying circuit optimized for low frequencies; and
    a voltage multiplier optimized for ultra-low frequencies.

* * * * *